(12) United States Patent
Bohn

(10) Patent No.: US 6,618,038 B1
(45) Date of Patent: Sep. 9, 2003

(54) POINTING DEVICE HAVING ROTATIONAL SENSING MECHANISMS

(75) Inventor: David D. Bohn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/586,103

(22) Filed: Jun. 2, 2000

(51) Int. Cl.[7] ............................................... H01L 27/00
(52) U.S. Cl. ..................................... 345/164; 250/208.1
(58) Field of Search ................................ 345/164, 163, 345/165, 166; 250/557, 208, 221; 358/473, 474, 479; 382/128

(56) References Cited

U.S. PATENT DOCUMENTS

| | | | |
|---|---|---|---|
| 4,799,055 A | 1/1989 | Nestler et al. ............... 340/710 |
| 4,847,484 A * | 7/1989 | Kikuchi ....................... 250/221 |
| 4,880,968 A * | 11/1989 | Kwang-Chien ............. 250/221 |
| 5,072,119 A * | 12/1991 | Yamaguchi .................. 250/588 |
| 5,355,146 A | 10/1994 | Chiu et al. ................... 345/156 |
| 5,578,813 A | 11/1996 | Allen et al. ............... 250/208.1 |
| 5,583,541 A * | 12/1996 | Solhjell ....................... 345/163 |
| 5,635,956 A * | 6/1997 | Tak .............................. 345/163 |
| 5,644,139 A | 7/1997 | Allen et al. .................. 250/557 |
| 5,786,804 A | 7/1998 | Gordon ........................ 345/158 |
| 5,909,209 A * | 6/1999 | Dickinson ................... 345/163 |
| 5,994,710 A * | 11/1999 | Knee et al. |
| 6,002,124 A | 12/1999 | Bohn et al. ............... 250/208.1 |
| 6,006,172 A * | 12/1999 | Snyder et al. ............... 702/186 |
| 6,057,540 A | 5/2000 | Gordon et al. .............. 250/221 |
| 6,245,017 B1 * | 6/2001 | Hashimoto et al. ......... 600/447 |
| 6,265,706 B1 * | 7/2001 | Oliver et al. ............. 250/208.1 |
| 6,268,598 B1 * | 7/2001 | Dow et al. ............... 250/208.1 |
| 6,281,882 B1 * | 8/2001 | Gordon et al. .............. 345/166 |
| 6,337,920 B1 * | 1/2002 | Muhlhoff ..................... 382/128 |
| 6,344,846 B1 * | 2/2002 | Hines .......................... 345/166 |

* cited by examiner

Primary Examiner—Vijay Shankar
Assistant Examiner—Nitin Patel

(57) ABSTRACT

A computer mouse has a plurality of motion sensors. The motion sensors generate data corresponding to their movement relative to a surface and transmit the data to a processor for analysis. The processor determines the rotational motion of the computer mouse and causes an image displayed on an associated video monitor to rotate proportionally to the relative movement of the computer mouse. The motion sensors may be two-dimensional photosensor arrays that generate image data of distinct features in the surface. As the computer mouse is moved relative to the surface, the locations of the distinct features move relative to the photosensor arrays. By analyzing this relative movement, the processor determines the rotational motion of the computer mouse.

46 Claims, 8 Drawing Sheets

POINTING DEVICE HAVING ROTATIONAL SENSING MECHANISMS

TECHNICAL FIELD OF THE INVENTION

The present invention relates to pointing devices and, more particularly, to a pointing device having a plurality of motion sensors to determine rotational movement of the pointing device relative to an object.

BACKGROUND OF THE INVENTION

A pointing device (sometimes referred to as a "mouse") is used to move an image, such as a cursor, on a video monitor as the pointing device is moved relative to a fixed object, such as a mouse pad. A motion sensor in the pointing device detects the movement of the pointing device relative to the object and generates data corresponding to the relative movement. The data is transmitted to a processor associated with the pointing device and the video monitor. Based on the data, the processor causes the image to move proportionally to the movement of the pointing device relative to the object. The pointing device may also be used to move complex images displayed on the video monitor, such as images associated with computer aided drafting programs.

Some pointing devices have a ball that extends from a surface on the pointing device to contact the object. As the pointing device is moved relative to the object, the ball rotates accordingly. A sensor within the pointing device measures the rotation of the ball. For example, the sensor typically measures an x-component and a y-component of the ball rotation. The x and y-components of the ball rotation correspond to x and y movements of the pointing device relative to the object. The sensor generates data corresponding to the ball rotation and transmits the data to a processor that is associated with the pointing device and the video monitor. The processor displays an image on the video monitor and causes the image to move proportionally to the ball rotation data. Accordingly, the image moves proportionally to the movement of the pointing device relative to the object.

Some pointing devices have position sensors that use optical devices. In one example of such a pointing device, the pointing device is placed on a surface that has specifically placed grid lines extending in an x-direction and a y-direction. The pointing device has an optical sensor attached thereto that detects the grid lines. As the pointing device is moved relative to the grid lines, the optical sensor generates data corresponding to the x and y movement of the pointing device relative to the surface. As was described with relation to the ball-type pointing device, a processor translates the movement of the pointing device into movement of an image, such as a cursor, on the video monitor.

Both the ball-type and the optical-type pointing devices have several disadvantages. Both pointing devices only generate data corresponding to the x and y movements of the pointing device relative to the object. Neither pointing device generates data corresponding to the rotation of the pointing device relative to the surface. Accordingly, neither pointing device is capable of causing an image displayed on the video monitor to rotate as the pointing device is rotated. Thus, when the cursor is used to manipulate images displayed on the video monitor, the images are unable to be rotated proportional to the rotation of the pointing device. Other commands, such as keyboard functions have to be used in order to rotate the images, which tend to be cumbersome. Another disadvantage of many optical-type pointing devices is that they may only be used on a surface with appropriate grid lines. If such a surface is not available or if the grid lines have deteriorated, the pointing devices are rendered inoperable.

A ball-type pointing device has disadvantages in that contaminants adversely affect its operation. For example, oils and other friction reducing chemicals may reduce the friction between the ball and the object. As the pointing device is moved relative to the object, the ball slides instead of rotating relative to the object. Accordingly, the pointing device is not able to generate data corresponding to its movement relative to the object. This results in the image not being able to move properly on the video monitor per the movement of the pointing device relative to the object. Another problem with ball-type pointing devices is that contaminants interfere with the motion sensors and cause corrupt data to be generated. This corrupt data, in turn, causes the image to move disproportionally relative to the movement of the pointing device. An optical-type pointing device is also susceptible to contamination. For example, if contaminants are located on the grid, the optical sensor may detect them as grid lines. The position data generated by the pointing device will then be inaccurate, which ultimately causes the movement of the image on the video monitor to be inaccurate.

Therefore, a need exists for a pointing device that overcomes the above-described problems and that is capable of generating data that causes an image displayed on a video monitor to rotate.

SUMMARY OF THE INVENTION

The present invention is directed toward a pointing device (sometimes referred to as a "mouse") that uses optical sensors to generate data corresponding to its movement relative to an object. The data corresponds to conventional movement in the x and y-directions in addition to data corresponding to the rotation of the pointing device relative to the object. The pointing device may comprise a housing having a first navigator and a second navigator located therein. The navigators may be two-dimensional photosensor arrays that generate image data representative of two area portions of the object. The object may, as examples, be a mouse pad or a sheet of paper.

The pointing device is electrically connected to a computer, which in turn is electrically connected to a video monitor. The computer analyzes the image data generated by the navigators to determine the movement of each navigator relative to the object. For example, if the object is a sheet of paper, the navigators generate image data representative of the surface features of the sheet of paper. As the pointing device moves relative to the sheet of paper, the surface features move relative to the navigators. By analyzing the movement of the surface features relative to the navigators, the motion of the pointing device relative to the object may be readily determined. The use of the two navigators further provides for the rotational motion of the pointing device relative to the object to be readily determined. For example, rotational movement of the pointing device may be derived from the difference in movement data generated by the two navigators.

The computer causes a cursor or other image to be displayed on the video monitor. As the pointing device is moved relative to an object, the cursor or other image displayed on the video monitor may move proportionally to the movement of the pointing device relative to the object. The pointing device disclosed herein provides rotational movement data to the computer. Accordingly, rotation of the pointing device may cause the cursor or other image displayed on the video monitor to rotate.

DETAILED DESCRIPTION OF THE INVENTION

Figure 1:
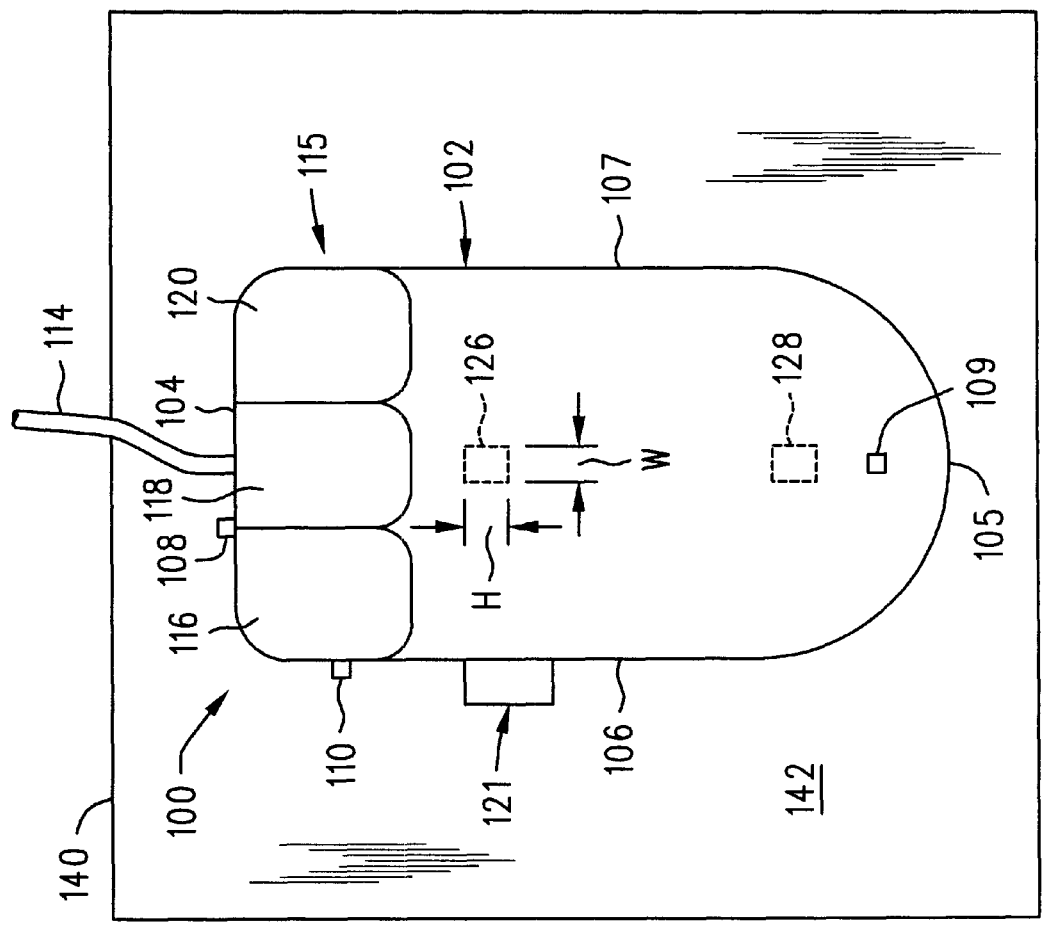
FIG. 1 is a top view of a pointing device located on an object.

FIGS. 1 through 8, in general, illustrate a pointing device 500 for directing movement of an image 210 displayed on a display device 504. The pointing device 500 comprises a chassis 504 adapted to be moved relative to an object 140 and a first photosensor device 510 movably attached to the chassis 504. The first photosensor device 504 is adapted to output data corresponding to images of the object 140.

FIGS. 1 through 8 also, in general, illustrate a pointing device 600 for directing movement of an image 210 displayed on a display device 204. The pointing device 600 comprises: a chassis 604 adapted to be moved relative to an object 140; a first photosensor device 610 attached to the chassis 604, the first photosensor device 610 being adapted to generate image data representative of a first area portion 168 of the object 140. The pointing device 600 further comprises a first light path 630 extending between a first plane and the first photosensor device 610 and a first lens 636 located in the first light path 630, wherein the first lens 636 is movable relative to the first photosensor device 610.

FIGS. 1 through 8 also, in general, illustrate a pointing device 100 for directing movement of an image 210 displayed on a display device 204. The pointing device 100 has a first operative mode and a second operative mode. The pointing device 100 comprises: a chassis 102 adapted to be moved relative to an object 140; a first photosensor device 158 attached to the chassis 102, the first photosensor device 158 being adapted to generate data corresponding to images of the object 210; and a light source 156 attached to the chassis 102. The light source 158 has a first operative mode and a second operative mode, wherein the light source 158 is in the first operative mode when the pointing device 100 is in the first operative mode, and wherein the light source 158 is in the second operative mode when the pointing device 100 is in the second operative mode.

FIGS. 1 through 8 also, in general, illustrate a pointing device for directing movement of an image 210 displayed on a display device 204. The pointing device 100 comprises: a chassis 102 adapted to be moved relative to an object 140; a two-dimensional photosensor array 158 attached to the chassis 102, the two-dimensional photosensor array 158 being adapted to generate data corresponding to images of the object 140; and a linear photosensor array 158 attached to the chassis 102, the linear photosensor array 158 being adapted to generate data corresponding to images of the object 140.

FIGS. 1 through 8 also, in general, illustrate a method of manipulating an image 210 displayed on a display device 204. The method comprises providing a pointing device 100 comprising a chassis 102 adapted to be moved relative to an object 140 and a first photosensor device 126 attached to the chassis 102, the first photosensor device 126 being adapted to generate image data representative of images of the object 140. The method further comprises: providing a processor 202 operatively associated with the pointing device 100 and the display device 204; moving the pointing device 100 relative to the object 140; generating image data representative of images of the object 140 using the pointing device 100; and transmitting the image data from the pointing device 100 to the processor 202. The image data is analyzed by the processor 202 to determine the movement of the pointing device 100 relative to the object 140 and to manipulate the image on the display device 204 based on the movement of the pointing device 100 relative to the object 140.

Having generally described the pointing device 100, it will now be described in greater detail.

A non-limiting embodiment of the pointing device 100 is illustrated in FIG. 1, which is a top plan view of the pointing device 100 located on a surface 142 an object 140. The pointing device 100 is sometimes referred to simply as a "mouse." The pointing device 100 may have a housing 102 having front portion 104, a rear portion 105, a left portion 106, and a right portion 107. The housing 102 and its internal structural members, not shown, are sometimes referred to as a chassis.

A plurality of buttons 115, a data cable 114, and a plurality of lenses may be attached to or integrally formed into the housing 102. In the non-limiting embodiment of the pointing device 100 illustrated herein, four buttons 115 are attached to the housing 102. The buttons 115 are referred to as the first button 116, the second button 118, the third button 120, and the fourth button 121. The first through the third buttons 115, 116, and 118 may be positioned to provide actuation by a user's fingers. The fourth button 121 may be positioned to provide actuation by a user's thumb. It should be noted that any number of buttons may be attached to the pointing device 100. The data cable 114 may be attached to a conventional computer, not shown, and may serve to electrically connect the buttons 115 and other electronic components within the pointing device 100 to the computer. Alternatively, the pointing device 100 may have conventional infrared, radio frequency, or other devices associated therewith that serve to electrically connect the pointing device 100 to the computer.

A lens 108 may protrude from the front portion 104 of the housing 102. A lens 109 may be recessed within the rear portion 105 of the housing 102. A lens 110 may protrude from the left portion 106 of the housing 102. The lenses 108, 109, 110 may serve as light sources to indicate operative modes of the pointing device 100. More specifically, light may enter the lenses from the interior of the housing 102 and may cause them to glow. The lenses may be optical devices that disperse light and, thus, glow when light enters them. As will be described below, light-emitting diodes or other light sources may be used instead of the lenses.

Figure 2:
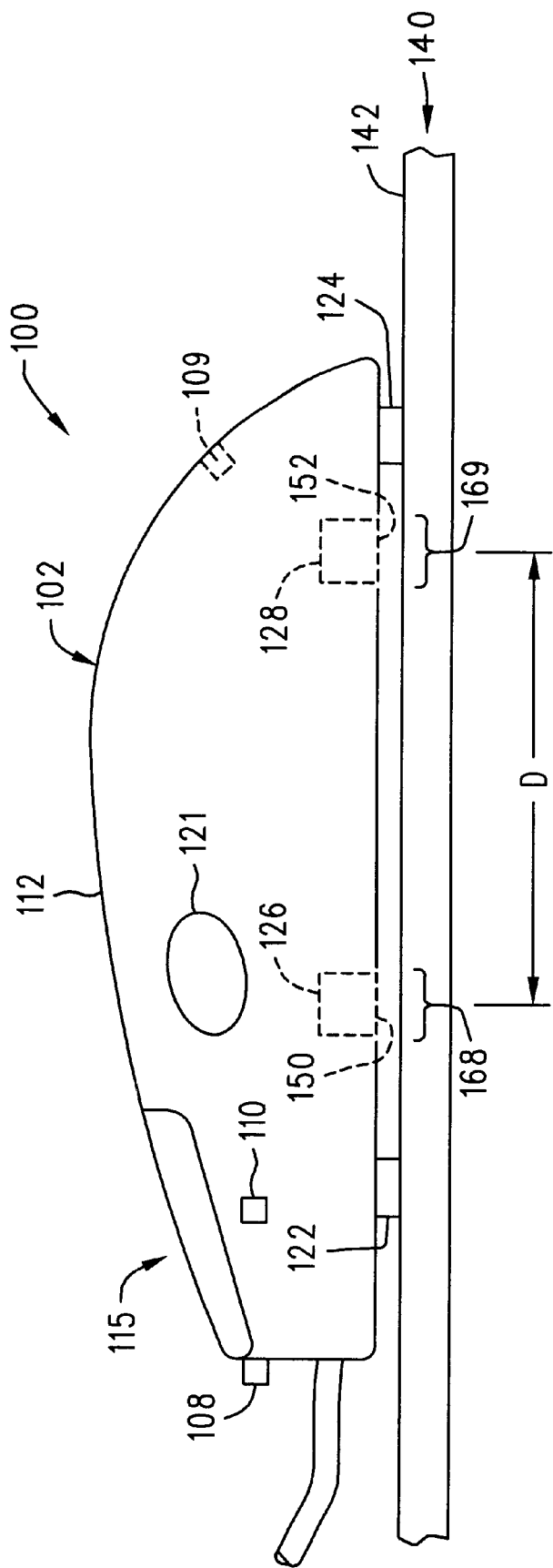
FIG. 2 is a side view of the pointing device and the object of FIG. 1.

Referring to FIG. 2, which is a side view of the pointing device 100 and the object 140, the pointing device 100 may have an upper portion 112 and a lower portion 113. The upper portion 112 may be curved so as to fit into the palm of a hand, which allows for a user to have easy access to the buttons 115. The lower portion 113 may be substantially planar and may have a first slide 122 and a second slide 124 attached thereto. The first slide 122 and the second slide 124 may be low friction components that serve to reduce the friction between the surface 142 of the object 140 and the pointing device 100. The reduced friction facilitates the movement of the pointing device 100 on the surface 142 of the object 140. The first slide 122 and the second slide 124 may also serve to maintain a constant distance between the lower portion 113 of the pointing device 100 and the surface 142 of the object 140. The surface 142 may have an image area 168 located proximate a first navigator 126 and a second image area 169 located proximate a second navigator 128. The locations of the first image area 168 and the second image area 169 are fixed to the pointing device 100. Accordingly, as the pointing device 100 moves relative to the surface 142, the first image area 168 and the second image area 169 move accordingly.

As briefly described above, the pointing device 100 may have a first navigator 126 and a second navigator 128 located therein. The first navigator 126 and the second navigator 128 may be separated by a distance D. As described in greater detail below, as the distance D increases, the accuracy of rotational movement data generated by the pointing device 100 increases. The distance D as a function of accuracy of navigation devices is explained in the U.S. Pat. No. 6,002,124 of Bohn et al. for PORTABLE IMAGE SCANNER WITH OPTICAL POSITION SENSORS, which is hereby incorporated by reference for all that is disclosed therein. The first and second navigators 126, 128 may, as examples, function in substantially similar manners as the navigators disclosed in the U.S. Pat. Nos: 5,644,139 of Allen et al. for NAVIGATION TECHNIQUE FOR DETECTING MOVEMENT OF NAVIGATION SENSORS RELATIVE TO AN OBJECT; and 5,578,813 of Allen et al. for FREEHAND IMAGE SCANNING DEVICE WHICH COMPENSATES FOR NON-LINEAR MOVEMENT; both of which are hereby incorporated by reference for all that is disclosed therein.

Figure 3:
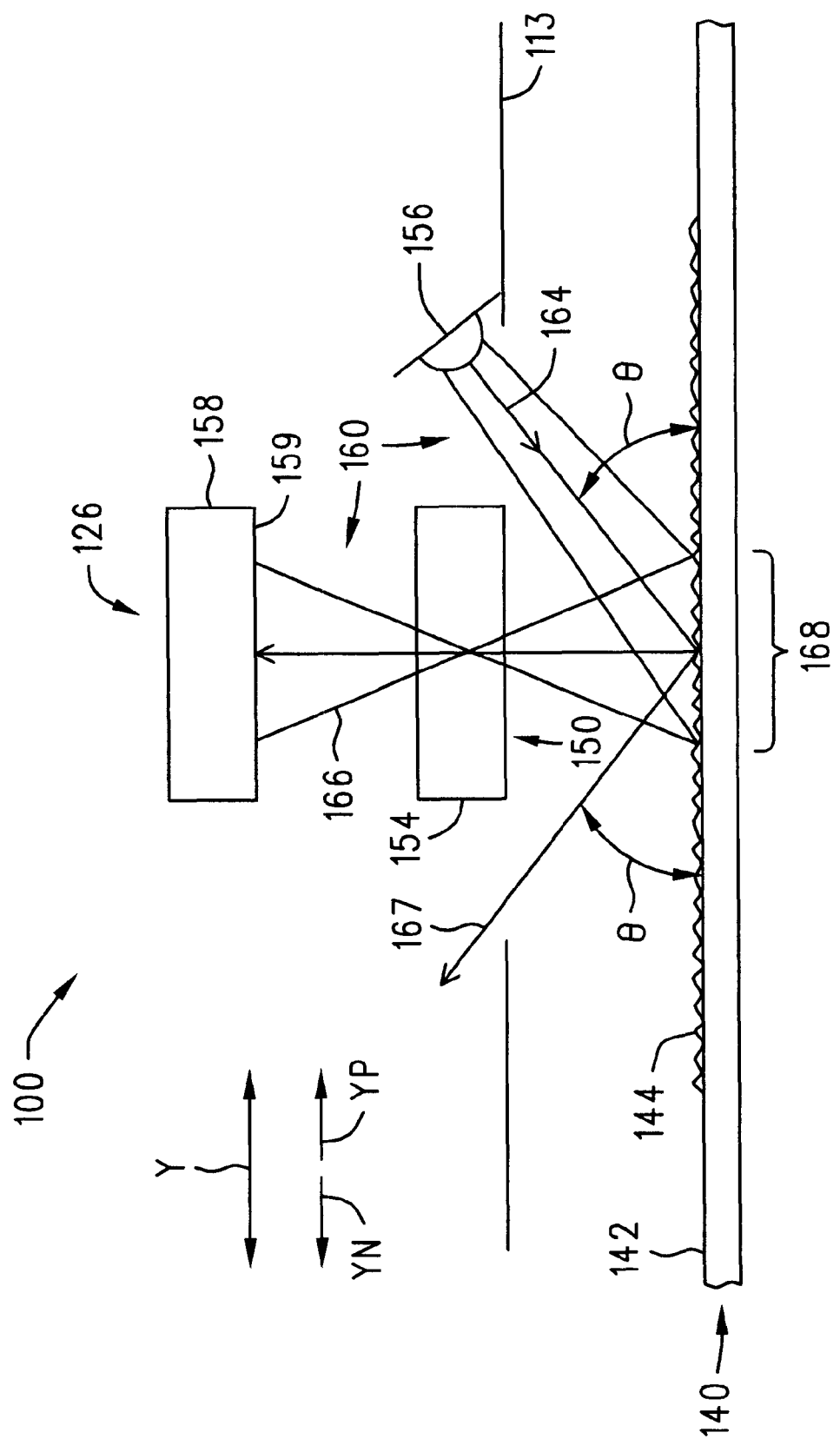
FIG. 3 is an enlarged side view of a navigator located within the pointing device of FIG. 2.

Referring briefly to FIG. 1, the first navigator 126 and the second navigator 128 may be similarly sized and each may have a width W and a height H. The width W and the height H may both, as examples, be approximately five millimeters. An enlarged side view of the first navigator 126 located within the pointing device 100 is illustrated in FIG. 3. The pointing device 100 may have a first aperture 150 formed in the lower portion 113 of the housing 102. A lens 154 may be located within the first aperture 150. The lens 154 may, as an example, have a magnification of approximately 1.417. An LED 156 or other light source may be located adjacent the first aperture 150 and the lens 154. The LED 156 may emit different colors of light. For example, if the pointing device 100 is being used as a conventional mouse, the LED 156 may emit light having a first band of wavelengths. If, however, the pointing device 100 is being used to generate rotational movement data, the LED 156 may generate light having a second band of wavelengths. As will be described below, the light emitted by the LED 156 may pass to the lenses 108–110, FIG. 1, where it may be readily observed by a user.

A two-dimensional photosensor array 158 (sometimes referred to herein simply as a "photosensor array") may be located adjacent the lens 154. The photosensor array 158 may have a surface 159, which has a plurality of photodetecting devices (sometimes referred to simply as "photodetectors"), not shown in FIG. 3, attached thereto. The photosensor array 158 serves to convert a two-dimensional image of the surface 142 of the object 140 to machine-readable image data (sometimes referred to herein simply as "image data"). The photodetectors may have a pitch of approximately sixty microns on the surface 159. The magnification of the lens 154 causes an effective pitch of approximately 42.333 microns to appear on the surface 142. As will be described below, the image data generated by the photosensor array 158 is analyzed to determine the movement of the pointing device 100 relative to the surface 142 of the object 140.

A light path 160 may extend between the LED 156 and the photosensor array 158. The light path 160 may have two components, an incident light path 164 and a reflected light path 166. The incident light path 164 may extend from the LED 156, through the first aperture 150 and to the surface 142 of the object 140. The incident light path 164 serves to illuminate the first image area 168 of the surface 142. The incident light path 164 intersects the 142 at an angle θ, which is sometimes referred to as the "grazing angle." As will be described below, in many embodiments of the pointing device 100, it is preferred to have the grazing angle θ relatively small, e.g., twenty degrees. The reflected light path 166 may extend from the surface 142 through the first aperture 150, through the lens 154 and to the surface 159 of the photosensor array 158. The lens 154 may serve to focus light in the reflected light path 166 onto the photodetectors on the surface 159 of the photosensor array 158.

A specular light path 167 may also extend from the first image area 168 at the angle θ. The specular light path 167 may extend to one or more of the lenses 108, 109, 110, FIG. 1, and may serve to cause these lenses to emit light. As will be described in greater detail below, the color of the light emitted by the LED 156 may be the color of light emitted by the lenses and may be changed to offer indications to the user. For example, the colors may indicate whether the pointing device 100 is generating rotational or conventional x, y, movement data.

The surface 142 of the object 140 may have a texture 144 formed thereon. The texture 144 may be random inconsistencies in the material from which the surface 142 is formed. For example, if the object 140 is a sheet of paper, the texture 144 may be the result of paper pulp used to manufacture the paper. As will be described further below, the photosensor array 158 may generate image data representative of the texture 144, which is used to determine the movement of the pointing device 100 relative to the surface 142. Alternatively, the texture 144 may be writing or other indicia printed onto the surface 142.

Having described the pointing device 100, its association with a computer system will now be described.

Figure 4:
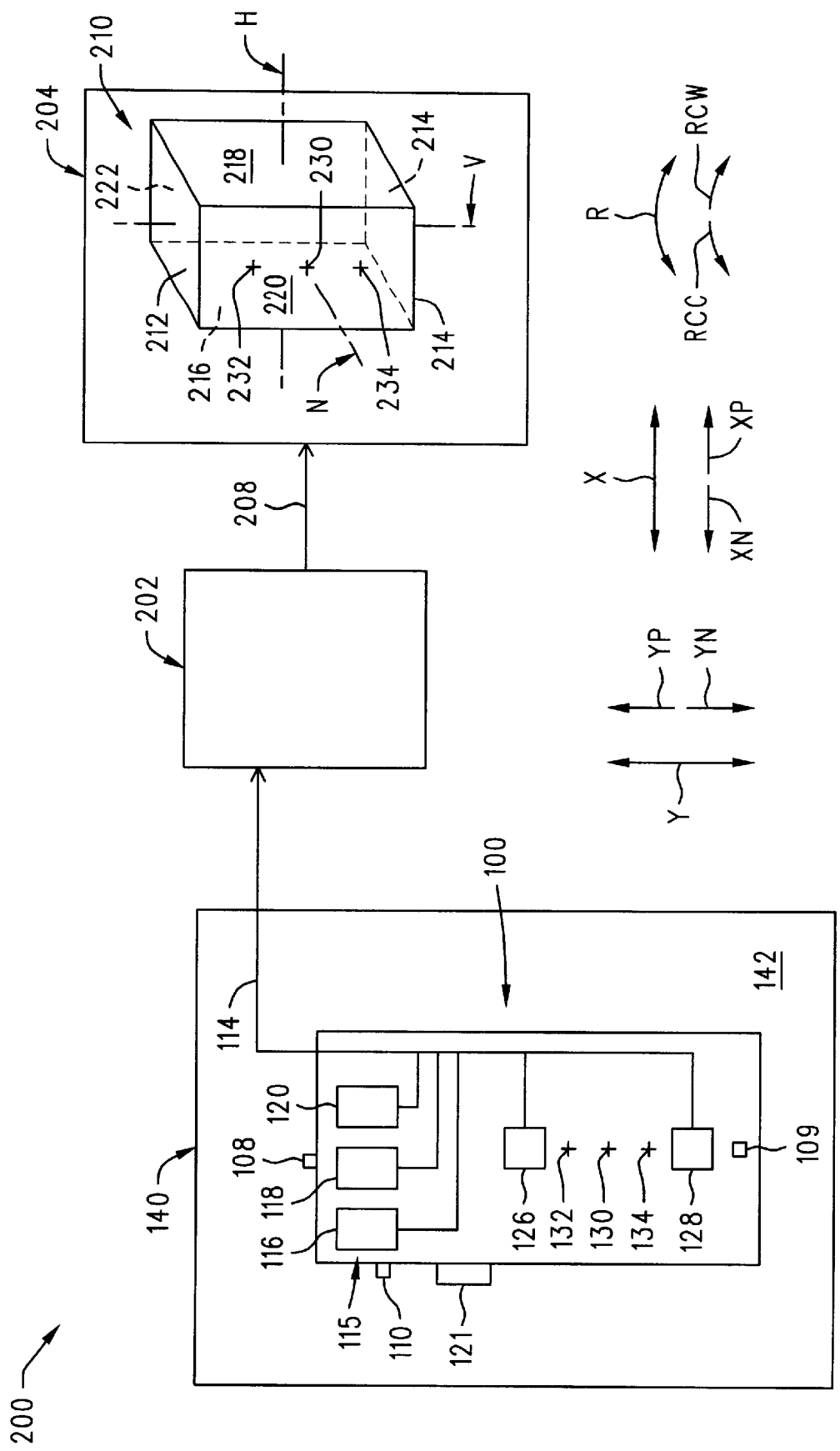
FIG. 4 is a block diagram of the pointing device of FIG. 1 used in conjunction with a computer system.

FIG. 4 illustrates, in block diagram format, the pointing device 100 operatively associated with a computer system 200. The computer system 200 illustrated in FIG. 4 may have the pointing device 100, a processor 202, and a video monitor 204 (sometimes referred to herein as a "display device"). The processor 202 may, as an example, be a conventional personal computer. The video monitor 204 may, as an example, be a conventional video display of the type used in conjunction with a conventional personal computer.

The data cable 114 of the pointing device 100 electrically connects the pointing device 100 to the processor 202. More specifically, the data cable 114 may electrically connect the buttons 115, the first navigator 126, and the second navigator 128 to the processor 202. The data cable 114 serves to transmit data between the pointing device 100 and the processor 202. It should be noted that other transmission devices may be used in place of the data cable 114. For example, an infrared or radio frequency device may serve to transmit data between the pointing device 100 and the processor 202.

A data cable 208 may electrically connect the processor 202 to the video monitor 204. The data cable 208 serves to transmit data from the processor 202 to the video monitor 204. The data causes the video monitor 204 to display images in a conventional manner. As will be described in detail below, the processor 202 determines where the image 210 is displayed and its movement on the video monitor 204. It should be noted that the data cable 208 may be substituted for other transmission devices, such as infrared, radio frequency, or other wireless devices.

For illustration purposes, a three-dimensional image 210 is illustrated as being displayed on the video monitor 204. For illustration purposes only, the image 210 is illustrated herein as being cube-shaped. The image 210 may have an upper side 212, a lower side 214, a left side 216, a right side 218, a front side 220, and a back side 222. A vertical axis V extends between the upper side 212 and the lower side 214. The vertical axis V is described herein as being substantially normal to the upper side 212 and the lower side 214 regardless of the orientation of the image 210 to the video display 204. A horizontal axis H extends between the left side 216 and the right side 218. The horizontal axis H is described herein as being substantially normal to the left side 216 and the right side 218 regardless of the orientation of the image 210 to the video display 204. An axis N may extend between the front side 220 and the back side 222 and may be normal to both regardless of the orientation of the image 210 to the video display 204. Alternatively the above-described axes may be referenced to the video display 204 rather than the image 210.

Having described the components of the pointing device 100, and the computer system 200, the operation of the pointing device 100 in conjunction with the computer system 200 will now be described.

Referring again to FIG. 1, the pointing device 100 is placed on the surface 142 of the object 140. As will be described in greater detail below, during operation of the pointing device 100, it is moved relative to the surface 142 of the object 140. As shown in FIG. 2, the first slide 122 and the second slide 124 contact the surface 142. The first slide 122 and second slide 124 are low friction components, which facilitate the movement of the pointing device 100 relative to the surface 142 by reducing the friction between the pointing device 100 and the surface 142. For reference purposes, several directions will be used to describe the movement of the pointing device 100 relative to the object 140 and the image 210 relative to the video display 204. A rotational direction, R, defines rotational movement. The rotation R is described in greater detail with a clockwise direction RCW and a counter clockwise direction RCC. With reference to more movement in a Cartesian plane, an x-direction X is perpendicular to a y-direction Y. The x-direction X is described in further detail with reference to a positive x-direction XP and a negative x-direction XN. Likewise, the y-direction Y is described in further detail with reference to a positive y-direction YP and a negative y-direction YN.

The operation of the first navigator 126 will now be described in detail. It is to be understood that during operation of the pointing device 100, the second navigator 128 operates in a substantially similar manner as the first navigator 126. As described above, during operation of the pointing device 100, the first navigator 126 and the second navigator 128 generate image data representative of images of the surface 142 of the object 140. Referring again to FIG. 3, during operation of the pointing device 100, the LED 156 emits light along the incident light path 164 to illuminate the first image area 168 of the surface 142. The incident light path 164 intersects the surface 142 at a grazing angle θ, which is relatively small. The small grazing angle θ causes the texture 144 to create shadows in the first image area 168. In addition to the shadows, the small grazing angle θ causes the texture 144 to create relatively bright areas where the light reflects from peaks in the texture 144. Accordingly, the image of the first image area 168 has bright areas and dark areas, which are readily identified by the processor 202, FIG. 4, as described below.

An image of the surface 142, including the texture 144, reflects from the first image area 168 in the reflected light path 166 and is focused onto the photosensor array 158 by the lens 154. The plurality of photodetectors located on the surface 159 of the photosensor array 158 generate image data representative of the first image area 168. Accordingly, the photosensor array 158 generates image data representative of the texture 144 in the first image area 168. Referring briefly to FIG. 2, it should be noted that as the pointing device 100 moves relative to the surface 142 the first and second image areas 168 and 169 also move relative to the surface 142.

While the LED 156 emits light, the specular light path 167 has light substantially similar to the color emitted by the LED 156. This light is directed to one or more of the lenses 108, 109, 110. The color of light emitted by the LED 156 may be selected to provide indications to the user. For example, the LED 156 may emit a first color when the pointing device 100 is being used as a conventional computer mouse. The LED 156 may, in a non-limiting example, emit a second color when the pointing device 100 is being used to rotate the image 210, FIG. 4, displayed on the video display 204.

Referring again to FIG. 4, the following description of analyzing image data generated by the navigators 126 and 128 is described in detail in the following U.S. Pat. Nos. which have been previously referenced: 5,644,139 of Allen et al. and 5,578,813 of Allen et al. The image data generated by the first navigator 126 and the second navigator 128 are transmitted via the data cable 114 to the processor 202. The image data may, as an example, be numerical values wherein each value is representative of the amount of light received by a photodetector.

The processor 202 analyzes the image data and locates distinct features on the surface 142 of the object 140. The distinct features are areas of light and dark contrast that result from the LED 156, FIG. 3, illuminating the texture 144. The processor 202 determines which photodetectors in the photosensor array 158, FIG. 3, generated the image data of the distinct features. The same process occurs with respect to the second navigator 128. Accordingly, the locations of the distinct features relative to the photosensor array 158 and, thus, the first navigator 126, and the second navigator 128 are readily determined. As the pointing device 100 is moved relative to the surface 142, the locations of the distinct features relative to the first navigator 126 and the second navigator 128 move accordingly. The processor 202 analyzes this relative movement to determine the movement of the pointing device 100 relative to the object 140. It should be noted that the processor 202 has been described herein as being a component that is external to the pointing device 100. It is to be understood that the pointing device 100 may have a processor, not shown, located therein that performs many of the processing steps described herein.

As described above, the processor 202 transmits data to the video monitor 204 via the data cable 208, which causes the image 210 to be displayed on the video monitor 204. The processor 202 causes the image 210 to move and rotate on the video monitor 204 based on the movement and rotation of the pointing device 100 relative to the object 140. The processor 202 provides rotational movement data for the image 210 by analyzing the change of image data of the first navigator 126 and the second navigator 128. For example, the processor 202 may detect that the first navigator 126 is moving in the positive x-direction XP and the second navigator 128 is moving in the negative x-direction XN relative to the object 140. Accordingly, the pointing device 100 is rotating in the counter clockwise direction RCC relative to the object 140. The processor 202 analyzes this rotation and causes the image 210 to rotate in the counter clockwise direction RCC about the axis N. The rotation of the image 210 may not directly correspond to the rotation of the pointing device 100. For example, rotating the pointing device 100 ten degrees in the counter clockwise direction RCC may cause the image 210 to rotate thirty degrees in the counter clockwise direction RCC.

In a conventional computer system 200, rotating an image is achieved by a plurality of commands. For example, a user may have to depress one or two keys on a keyboard while moving a conventional pointing device in an x or y direction in order to rotate the image. The computer system 200 described herein replaces the need to depress keys while moving a pointing device. In addition rotation of the image 210 is achieved by rotating the pointing device 100 without the need to translate movement in an x or y direction into rotational movement of the image 210.

In addition to the rotation of the image 210, the processor 202 may cause the image 210 to move in the x-direction X and the y-direction Y. In one embodiment depressing one of the buttons 115, e.g., the first button 116, will cause a cursor, not shown, to select the image 210. The image 210 may then be moved in the x-direction X and the y-direction Y without any rotational movement.

The processor 202 may enter a mode where it causes the image 210 to rotate by depressing the fourth button 121. Upon entering this mode, the processor 202 may transmit a signal to the LED 156, FIG. 3, causing it to emit a particular color of light. This, in turn, causes the lenses 108–110 to emit the light, which signals the user that the computer system 200 is in mode which will cause the image 210 to rotate. Rotating the image 210 may be achieved by depressing the first button 116, which may cause the image 210 to rotate about the N axis upon rotation of the computer system 200. Depressing the second button 118 may cause the image 210 to rotate about the vertical axis V upon rotation of the computer system 200. Depressing the third button 120 may cause the image 210 to rotate about the horizontal axis H upon rotation of the computer system 200. Alternatively, the user may define an axis relative to the image 210 about which the image 210 will rotate. In yet another alternative, the axes may be referenced to the video display 204 and the image 210 may rotate about these axes referenced to the video display 204.

The processor 202 may cause the image 210 to rotate and move in the x-direction X and the y-direction Y simultaneously. For example, if the processor 202 determines that the first navigator 126 and the second navigator 128 are moving in the positive y-direction YP and the positive x-direction XP, the processor 202 will cause the image 210 to move in the positive y-direction YP and the positive x-direction XP accordingly. If the processor 202 additionally determines that the first navigator 126 is moving in the positive x-direction XP at a different rate than the second navigator 128, the processor 202 may rotate the image 210 as it moves in the positive x-direction XP and the positive y-direction YP. The processor 202 may calculate the difference in movement rates in the positive x-direction XP between the first navigator 126 and the second navigator 128 and apply the difference to the rotation.

The computer system 200 has been described herein as rotating an image displayed on a video monitor. It is to be understood that the rotational data generated by the pointing device 100 may be used for other purposes, such as games. For example, if the computer system 200 is used to run a flight simulator game, the rotation of the pointing device 100 may serve to control aircraft ailerons. The x-direction X and y-direction Y of the pointing device 100 may be used to control the stabilizer and rudder. Accordingly, more data may be provided by the pointing device 100 described herein than conventional pointing devices.

Having described an embodiment of the pointing device 100 and the computer system 200, other embodiments will now be described.

In one embodiment of the computer system 200, the image 210 may rotate about different axes that are parallel to the axes N, H, and V described above. An example of this embodiment is provided with regard to the normal axis N. The difference in movement between the first navigator 126 and the second navigator 128 is used to determine the location of the axis of rotation of the pointing device 100. For example, if the first navigator 126 is moved in the positive x-direction XP at the same rate as the second navigator 128 is moved in the negative x-direction XN, the axis of rotation is at a first rotation point 130. The processor 202 may, thus, rotate the image 210 about a first rotation point 230, which is centrally located on the front side 220 of the image 210. If the movement of the first navigator 126 in the positive x-direction XP is slower than the movement of the second navigator 128 in the negative x-direction XN, then the pointing device 100 is rotating about an axis located close to the first navigator 126. An example of such an axis is referenced as the second rotation point 132. The processor 202 then rotates the image 210 about a second rotation point 232 that is located close to the upper side 212. If the movement of the first navigator 126 in the positive x-direction XP is faster than the movement of the second navigator 128 in the negative x-direction XN, then the pointing device 100 is rotating about an axis that is close to the second navigator 128. An example of such an axis is referenced as the third rotation point 134. Accordingly, the processor 202 will cause the image 210 to rotate about a third rotation point 234 that is located close to the lower side 214. The above-described axes of rotation may also be applicable to situations where both the first navigator 126 and the second navigator 128 are moving in the same direction, e.g., the positive x-direction XP.

Figure 5:
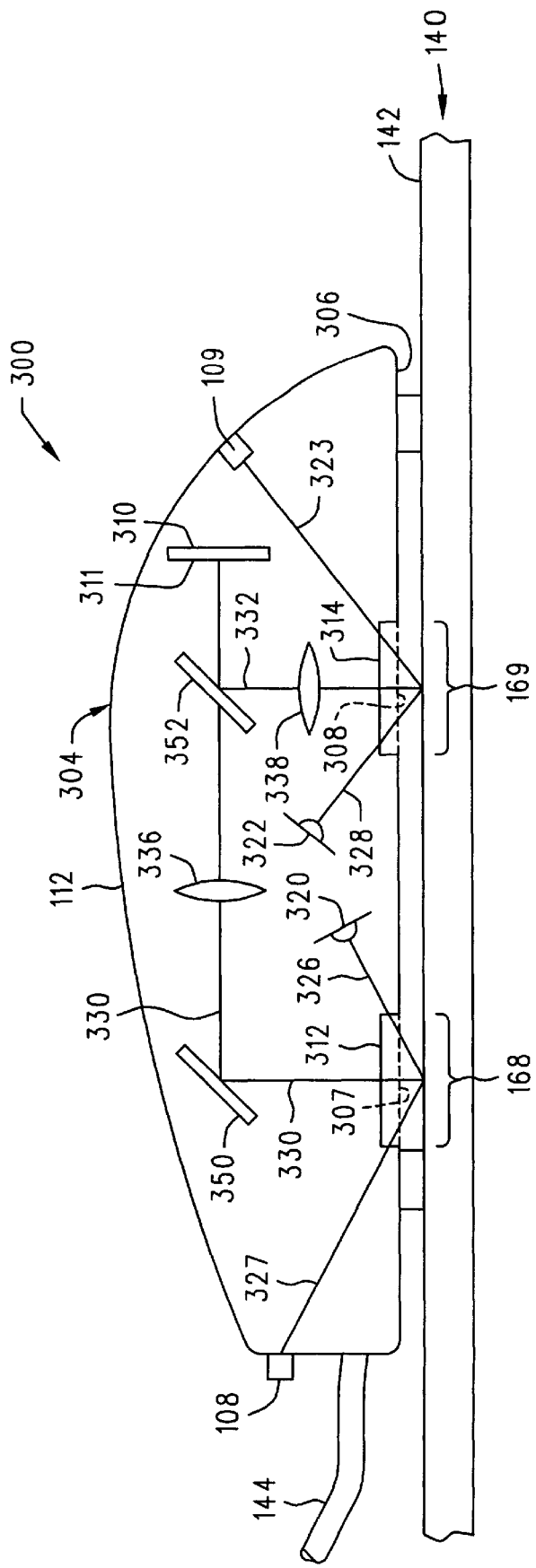
FIG. 5 is a schematic illustration of an embodiment of a pointing device having a single two-dimensional photosensor.

Another embodiment of a pointing device 300 is illustrated in FIG. 5, which is a side, cut away schematic illustration of the pointing device 300 using a single photosensor array 310. The pointing device 300 has a housing 304 that is substantially similar to the housing 110 of FIG. 2. The housing 304 has a lower surface 306 with a first aperture 307 and second aperture 308 formed therein. As shown in FIG. 5, the photosensor array 310 is substantially perpendicular to the lower surface 306. As shown in FIG. 5, the housing 304 may have the lenses 108 and 109 as previously described.

The first aperture 307 may have a first window 312 located therein and the second aperture 308 may have a second window 314 located therein. A first LED 320 or other light source may be located proximate the first aperture 307 and a second LED 322 or other light source may be located proximate the second aperture 308. The first LED 320 may emit light having frequencies in a first frequency band and a second frequency band. Accordingly, the first LED 320 may emit two colors of light. The second LED 322 may emit light having frequencies in a third frequency band.

A first lens 336, a second lens 338, a first reflector 350, and a second reflector 352 may also be located within the housing 304. The first reflector 350 may reflect light emitted by the first LED 320 having frequencies in the first frequency band and the second frequency band. The second reflector 352 may reflect light emitted by the second LED 322 having frequencies in the third frequency band. The second reflector 352 may also pass light having frequencies in the first and second frequency bands.

In addition to the above-described components, several light paths may be present within the housing 304. A first incident light path 326 may extend between the first LED 320 and the first image area 168 of the surface 142. A second incident light path 328 may extend between the second LED 322 and the second image area 169 of the surface 142. A first reflective light path 330 may extend between the first image area 168 and the photosensor array 310. The first reflective light path 330 may pass through the first window 312, reflect from the first reflector 350, be focused by the first lens 336 and pass through the second reflector 352. The second reflective light path 332 may pass through the second window 314, be focused by the second lens 338, and reflect from the second reflector 352.

A first specular light path 327 may extend between the first image area 168 and the lens 108. A second specular light path 323 may extend between the second image area 169 and the lens 109. As described above with reference to the lenses 108, 109, they will emit light that is substantially similar to the light emitted by their corresponding LEDs 320, 322.

Except for the first specular light path 327 and the second specular light path 323, the optics in the pointing device 300 function in a manner similar to those described in U.S. patent application Ser. No. 09/382,939 of Bohn for POSITION SENSING DEVICE HAVING A SINGLE PHOTOSENSING ELEMENT filed on Aug. 25, 1999, which is hereby incorporated by reference for all that is disclosed therein. The pointing device 300 is used to measure the motion of the pointing device 300, including rotational motion, by imaging the surface 142 of the object 140 as described with reference to the pointing device 100 of FIG. 1. The pointing device 300, however, uses a single photosensor array 310, which reduces the cost of the pointing device 300. Only a single light path 330, 332 at a time is active during operation of the pointing device 300, which is accomplished by activating either the first LED 320 or the second LED 322. A processor, not shown in FIG. 5, may activate the first LED 320 and deactivate the second LED 322. When the first LED 320 is activated, the photosensor array 310 generates image data representative of the first image area 168. When the image data has been generated, the processor deactivates the first LED 320 and activates the second LED 322. Accordingly, the photosensor array 310 generates image data representative of the second image area 169. The processor uses the image data in the same manner as described above with reference to the pointing device 100 of FIG. 4. The processor may then calculate rotation of the pointing device 300 and use the rotation to manipulate images displayed on a video monitor.

As described above, the processor may cause the first LED 320 to emit light having a first color to indicate that the pointing device 300 is in a mode to determine x and y movement. The processor may cause the first LED 320 to emit a second color of light to indicate that the pointing device 300 is in a mode to determine rotational movement of the pointing device 300. The first and second light colors are emitted by the lens 108. Similar indications may be accomplished via the second LED 322 and the lens 109.

Figure 6:
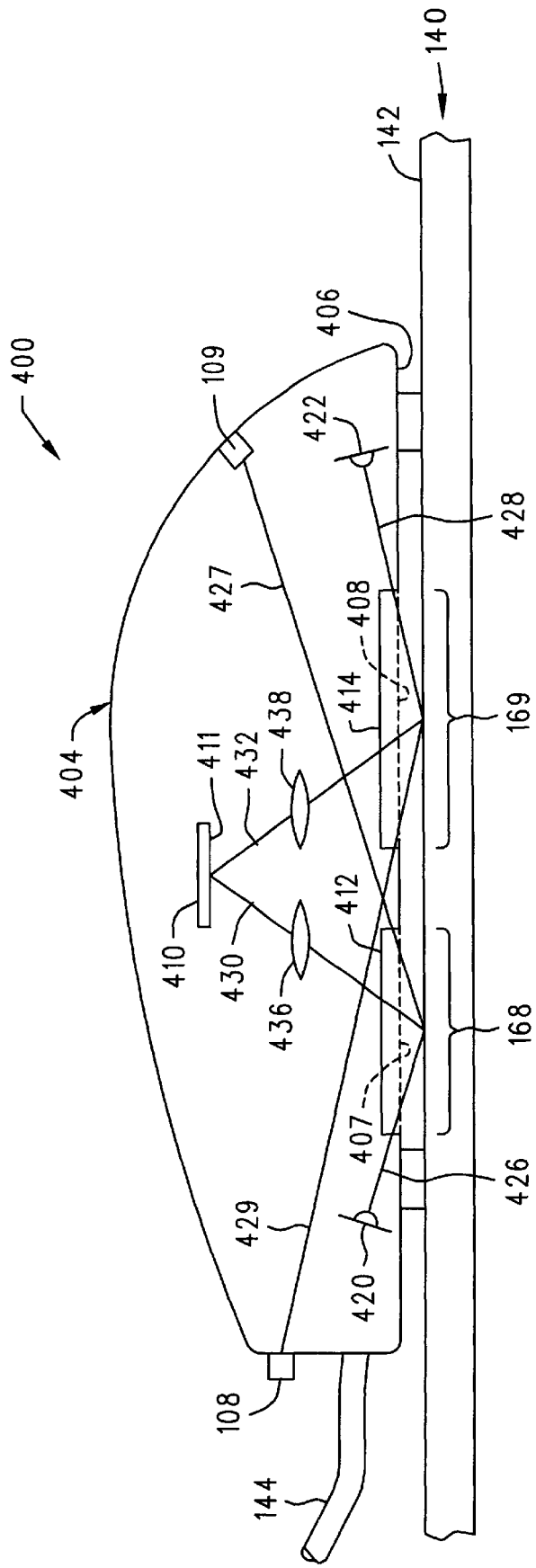
FIG. 6 is a schematic illustration of a second embodiment of a pointing device having a single two-dimensional photosensor.

Another embodiment of a pointing device 400 using a single photosensor array 410 is illustrated in FIG. 6. The pointing device 400 may have a housing 404 with a lower surface 406. The lower surface 406 may have a first aperture 407 and a second aperture 408 formed therein. A first window 412 may be located in the first aperture 407 and a second window 414 may be located in the second aperture 408. The photosensor array 410 may be located within the housing 404 between the first aperture 407 and the second aperture 408.

In addition to the above-described components, a first LED 420, a second LED 422, a first lens 436, a second lens 438, and several light paths may be located within the housing 404. A first incident light path 426 may extend between the first LED 420 and the first image area 168. A second incident light path 428 may extend between the second LED 422 and the second image area 169. A first reflective light path 430 may extend between the first image area 168 and a surface 411 of the photosensor array 410. The first reflective light path 430 may pass through the first aperture 407, the first window 412, and the first lens 436. A second reflective light path 432 may extend between a second image area 169 and the surface 411 of the photosensor array 410. The second reflective light path 432 may pass through the second aperture 408, the second window 414, and the second lens 438. Both the first LED 420 and the second LED 422 may emit light having a first color or a second color.

A first specular light path 427 may extend between the first image area 168 and the lens 109. Accordingly, the lens 109 emits light corresponding to the color of the light emitted by the first LED 420. A second specular light path 429 may extend between the second image area 169 and the lens 108. Accordingly, the lens 109 emits light corresponding to the color of the light emitted by the second LED 422. As described above, the colors of light emitted by the lenses 108, 109 may be used to indicate the mode which the pointing device 400 is in.

The second lens 438 and the second lens 438 are placed within the housing 404 to direct the first reflective light path 430 and the second reflective light path 432 to the surface 411 of the photosensor array 410. More specifically, the focal axes of the lenses 436, 438 may be positioned so as to steer the light paths 430, 432. Examples of steering light paths associated with a photosensor array are described in U.S. patent application, Ser. No. 09/382,939, previously referenced.

As with the pointing device 300 of FIG. 5, the pointing device 400 uses a single photosensor array 410 by only activating a single light path 430, 432 at a time. As with the pointing device 300 of FIG. 5, control of the activation of the light paths may be accomplished by activating and deactivating the first LED 420 and the second LED 422. The photosensor array 410 converts images of the first image area 168 and the second image area 169 to image data as described above and uses the image data to maneuver an image on a video display as described above.

Figure 7:
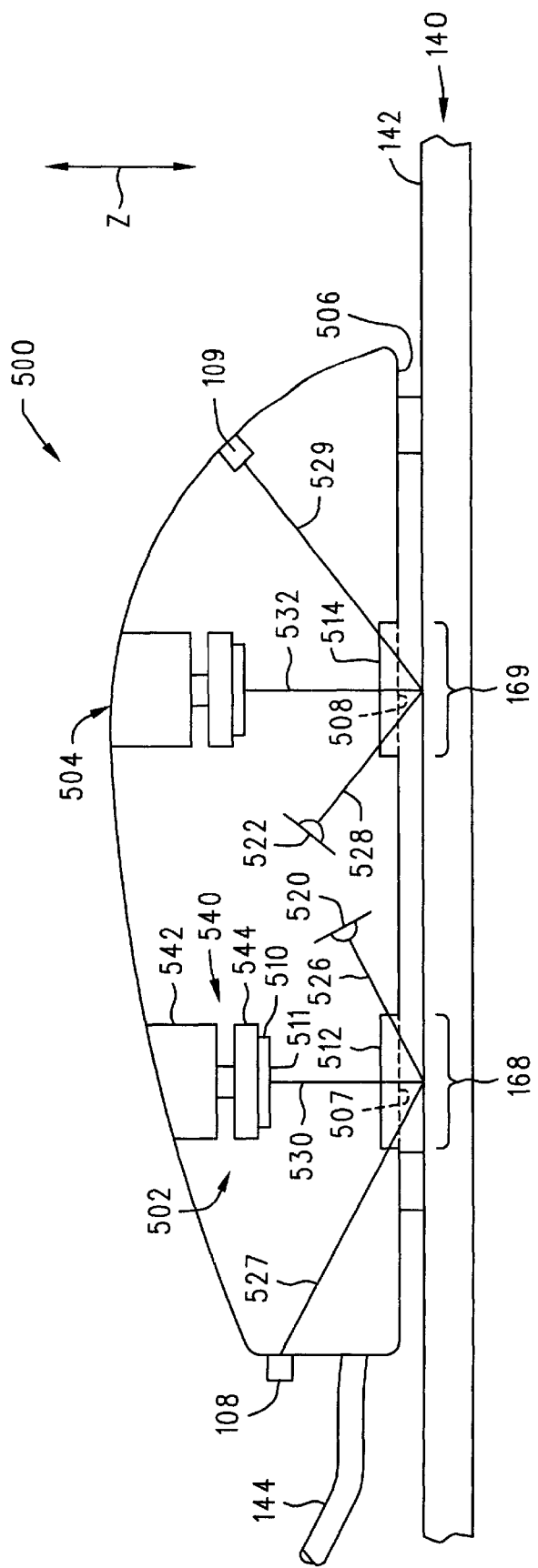
FIG. 7 is a schematic illustration of a pointing device having movable two-dimensional photosenors.

An embodiment of a pointing device 500 having movable photosensors is illustrated in FIG. 7. Examples of movable photosensors used for imaging are disclosed in the U.S. patent application, Ser. No. 09/408,357 of Bohn for POSITION SENSING DEVICE HAVING A MOVABLE PHOTOSENSING ELEMENT, filed on Sep. 29, 1999, which is hereby incorporated by reference for all that is disclosed therein. The pointing device 500 has two motion sensors to which the photosensors are attached. Only one motion sensor 502 is described herein. The other motion sensor that is not described is identical to the motion sensor 502. The pointing device 500 has a housing 504 with a lower surface 506. The lower surface 506 may have a first aperture 507 with a first window 512 located therein and a second aperture 508 with a second window 514 located therein. It should be noted that the first window 512 may be a lens that focuses light onto the photosensor array 510.

The motion sensor 502 has an actuator 540 with the photosensor array 510 attached thereto. As described above with reference to the other embodiments, the photosensor array 510 has a surface 511 to which a two-dimensional array of photodetectors may be attached. The actuator 540 has a first portion 542 movably attached to a second portion 544. The first portion 542 is attached to the housing 504 and the photosensor array 510 is attached to the second portion 544. Accordingly, the actuator 540 may move the photosensor array 510 relative to the housing 504 and the surface 142 of the object 140. The actuator 540 may be adapted to move the photosensor array 510 along a plane that is parallel to the surface 142 of the object 140 and along a z-direction Z that is normal to the surface 142.

A first LED 520 may be located near the first aperture 507 and a LED 522 may be located near the second aperture 508. As described with respect to the other LEDs, the LEDs 520, 522 may emit light having different colors. An incident light path 526 may extend between the first LED 520 and the first image area 168 of the surface 142. A first reflective light path 530 may extend between the first image area 168 and the surface 511 of the photosensor array 510. The first reflective light path 530 may extend through the first aperture 507 and the first window 512. A specular light path 527 may extend between the first image area 168 and the lens 108 and, as described above, may serve to illuminate the lens 108 with the light color emitted by the LED 520. A light path 528 may extend between the LED 522 and the second image area 169. A light path 529 may extend between the second image area 169 and the lens 109 and serves to cause the lens 109 to emit light having a color substantially similar to the color of light emitted by the LED 522.

During operation of the pointing device 500, the LED 520 emits light that illuminates the first image area 168. Light reflects from the first image area 168 and is focused by the first window 512 onto the surface 511 of the photosensor array 510. Focusing is also achieved by moving the second portion 544 and, thus, the photosensor array 510, in the z-direction Z. As the pointing device 500 is moved relative to the surface 142, a processor, not shown in FIG. 7, causes the actuator 540 to move the second portion 544 relative to the first portion 542. Accordingly, the photosensor array 510 is moved relative to the housing 504. The movement of the photosensor array 510 follows distinct features on the surface 142. This physical movement of the photosensor array 510 in addition to the optical navigation described above enhances the navigation ability of the pointing device 500. It further allows for a smaller and less expensive photosensor array 510 to be used within the pointing device 500.

The data generated by the photosensor array 510 is processed by a processor, not shown in FIG. 7. The data is then used to maneuver an image displayed on a video monitor.

Figure 8:
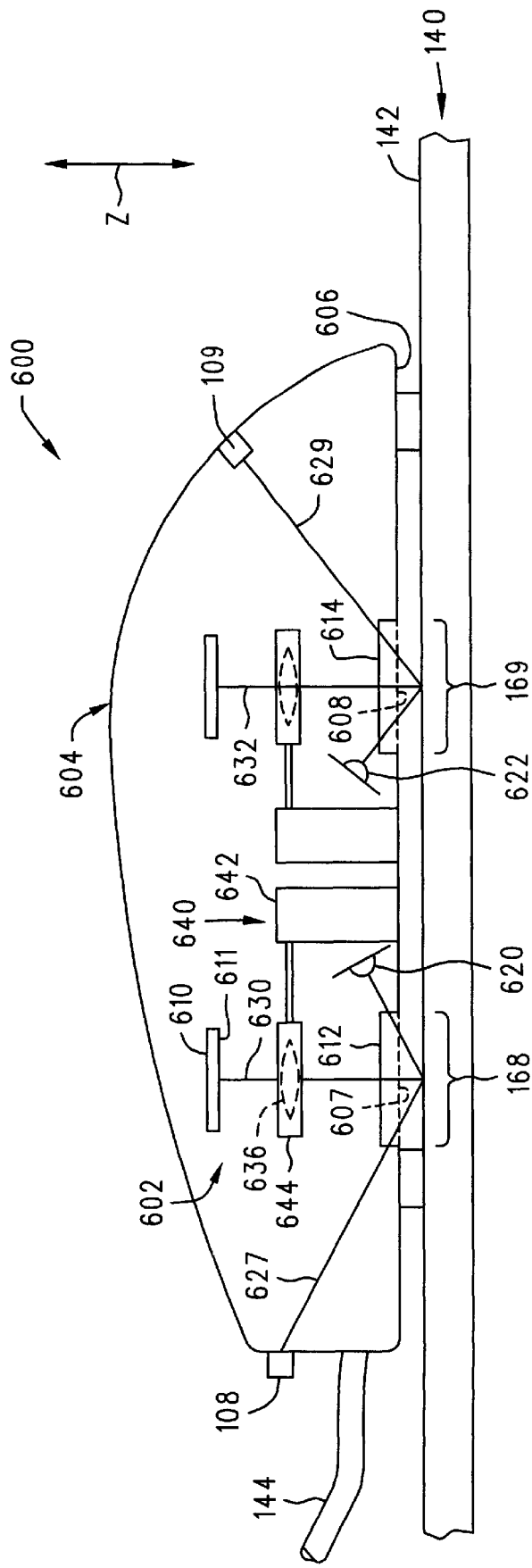
FIG. 8 is a schematic illustration of a pointing device having movable lenses associated with two-dimensional photosensor arrays.

A pointing device 600 having a movable lens 636 is illustrated in FIG. 8. Examples of movable lenses associated with photosensing devices are illustrated in the U.S. patent application, Ser. No. 09/408,357, previously referenced. The pointing device 600 may have a housing 604 with a lower surface 606 formed thereon. The lower surface 606 may have a first aperture 607 formed therein with a first window 612 formed therein. Two motion sensors may be located within the housing 604, however, only one motion sensor 602 will be described. The other motion sensor operates identically to the motion sensor 602.

A photosensor array 610, a first window 612, a LED 620, a lens 636 and several light paths may be located within the housing 604. The LED 620 may be located near the first window 612 and may emit several colors of light. A first incident light path 626 may extend between the LED 620 and the first image area 168 on the surface 142 of the object 140. A first reflective light path 630 may extend between the first image area 168 and a surface 611 on the photosensor array 610. A specular light path 627 may extend between the first image area 168 and the lens 108. As described above, the light path 627 serves to illuminate the lens 108 to provide an indication to the user of the pointing device 600. A similar specular light path may extend to the lens 109.

The motion sensor 602 is substantially similar to the motion sensor 502 of FIG. 7, however, the motion sensor 602 moves the lens 636 relative to the surface 142 rather than moving a photosensor. The motion sensor 602 has an actuator 640 that has a first portion 642 attached to the housing 604 and a second portion 644 to which the lens 636 is attached. The first portion 642 moves the second portion 644 and, thus, the lens 636 relative to the surface 142 of the object 140.

As with the pointing device 500 of FIG. 7 described above, the lens 636 is moved to track distinct features present on the surface 142 of the object 140. This movement enhances the operation of the pointing device 600 and permits a smaller photosensor array 610 to be used with the pointing device 600. The lens 636 may also move in the z-direction Z to focus the surface 142 onto the surface 611 of the photosensor array 610.

Referring again to FIG. 1, the pointing device 100 and its embodiments have been described as having lenses 108, 109, and 110 to the housing 102. It should be noted that other indicators may be used in place of the lenses. For example, multicolored LEDs may be used in place of the lenses. This alleviates the need to have light paths within the pointing device 100 associated with the lenses. It should be noted that the lenses 108, 109, 110 or other light sources may be used to indicate whether the pointing device is being used to rotate an image or to simply move an image. Thus, the light emitted by the lenses 108, 109, 110 may be used to indicate the operative mode of the pointing device 100.

The pointing device 100 and its embodiments have been described herein as having two motion sensors or photosensor arrays. It should be noted that any number of motion sensors or photosensor arrays may be used and that increasing the number of photosensor arrays increases the accuracy to which rotational movement can be derived. It should also be noted that a single photosensor array may be used within the pointing device 100. In another embodiment, a plurality of photosensor array may be placed adjacent each other. This increases the area of the surface of the object being imaged and, thus, increases the accuracy of the pointing device.

In addition, the pointing device 100 only needs to use one photosensor array when it is generating movement data. Accordingly, only one of either the first image area 168 or the second image area 169 needs to be illuminated. For example, if a user requires simple movement data, such as in the x-direction X and the y-direction Y, the user may cause the pointing device 100 to enter a mode wherein a single photosensor array is active. If the user requires accurate rotational movement, the user may cause the pointing device 100 to enter a mode wherein multiple photosensor arrays are active.

It should also be noted that the pointing devices described herein may function with a single two-dimensional photosensor array and a single linear photosensor array. With reference to FIG. 1, the first navigator 126 may comprise a two-dimensional photosensor array. The second navigator 128 may comprises a linear photosensor array that extends in the x-direction X. The first navigator 126 may be used for movement in the x and y-directions X and Y. The second navigator 128 maybe used to provide rotational information. More specifically, the second navigator may provide data as to the movement of the pointing device 100 in the x-direction X. This data is compared to the movement in the x-direction X sensed by the first navigator 126 to determine the rotation of the pointing device 100 as described above.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A pointing device for directing movement of an image displayed on a display device, said pointing device comprising:
   a chassis adapted to be moved relative to an object; and
   a first photo sensor device movably attached to said chassis, said first photo sensor device being adapted to output data corresponding to image of said object;
   a first light path extending from a plane to said first two-dimensional photo sensor array, said plane being located exterior to said chassis.

2. The pointing device of claim 1 and further comprising a second photosensor device attached to said chassis, said second photosensor device being adapted to output data corresponding to images of said object.

3. The pointing device of claim 2 wherein said second two-dimensional photosensor array is movably attached to said chassis.

4. The pointing device of claim 1 wherein said photosensor device is a two-dimensional photosensor array.

5. The pointing device of claim 1 and further comprising a second photosensor device wherein said second photosensor device comprises a linear array of photodetector elements.

6. The pointing device of claim 1 and further comprising a first light source and a second light path, said second light path extending between said first light source and said plane.

7. The pointing device of claim 6 wherein said first light source is adapted to emit light having frequencies in a first frequency band and a second frequency band.

8. The pointing device of claim 6 and further comprising a third light path and a lens, said lens being attached to said chassis, and said third light path extending between said plane and said lens.

9. The pointing device of claim 6 and further comprising a second light source attached to said chassis, wherein said first light source is operatively associated with said second light source.

10. The pointing device of claim 9 wherein said first light source and said second light source each have at least one active mode, and wherein said second light source is in said at least one active mode when said first light source is in said at least one active mode.

11. The pointing device of claim 1 wherein said first two-dimensional photosensor array is movably mounted to said chassis along a first axis and a second axis and wherein said first axis is substantially perpendicular to said second axis.

12. The pointing device of claim 11 wherein said two-dimensional photosensor array is further movably mounted to said chassis along a third axis and wherein said third axis is substantially normal to a plane defined by said first axis and said second axis.

13. The pointing device of claim 1 and further comprising an actuator, said actuator having a first portion that is movably associated with a second portion, said actuator first portion being attached to said chassis and said two-dimensional photosensor array being attached to said actuator second portion.

14. The pointing device of claim 1 wherein said pointing device has a first operative mode and a second operative mode and further comprising a light source attached to said chassis, said light source being in a first operative mode when said pointing device is in said first operative mode and said light source being in a second operative mode when said pointing device is in said second operative mode.

15. A pointing device for directing movement of an image displayed on a display device, said pointing device comprising:
   a chassis adapted to be moved relative to an object;
   a first photosensor device attached to said chassis, said first photosensor device being adapted to generate image data representative of a first portion of said object;
   a first light path extending between a first plane and said first photosensor device; and
   a first lens located in said first light path, said first lens being movable relative to said first photosensor device.

16. The pointing device of claim 15 and further comprising:
   a second photosensor device attached to said chassis, said second photosensor device being adapted to generate image data representative of a second area portion of said object; and
   a second light path extending between a second plane and said second photosensor device.

17. The pointing device of claim 16 and further comprising a second lens, wherein said second lens is located in said second light path and is movable relative to said second photosensor device.

18. The pointing device of claim 15 and further comprising a fourth light path and a lens, said lens being attached to said chassis, and said fourth light path extending between said first plane and said lens.

19. The pointing device of claim 15 wherein said first photosensor device comprises a two-dimensional photosensor array.

20. The pointing device of claim 15 and further comprising a second photosensor device wherein said second photosensor device comprises a linear array of photodetector elements.

21. The pointing device of claim 15 and further comprising a first light source and a third light path, said third light path extending between said first light source and said first plane.

22. The pointing device of claim 21 wherein said first light source is adapted to emit light having frequencies in a first frequency band and a second frequency band.

23. The pointing device of claim 21 and further comprising a second light source attached to said chassis.

24. The pointing device of claim 23 wherein said first light source is operatively associated with said second light source.

25. The pointing device of claim 23 wherein said first light source and said second light source each have at least one active mode, and wherein said second light source is in said at least one active mode when said first light source is in said at least one active mode.

26. The pointing device of claim 15 wherein said first lens is movably mounted to said chassis along a first axis and a second axis and wherein said first axis is substantially perpendicular to said second axis.

27. The pointing device of claim 26 wherein said first lens is further movably mounted to said chassis along a third axis wherein said third axis is substantially normal to a plane defined by said first axis and said second axis.

28. The pointing device of claim 15 and further comprising an actuator, said actuator having a first portion that is movably associated with a second portion, said actuator first portion being attached to said chassis and said actuator second portion being attached to said first lens.

29. A pointing device for directing movement of an image displayed on a display device, said pointing device having a first operative mode and a second operative mode, said pointing device comprising:
   a chassis adapted to be moved relative to an object;
   a first photosensor device attached to said chassis, said first photosensor device being adapted to output data corresponding to images of said object;
   wherein said image displayed on said display device is movable proportional to movement of said first photosensor device relative to said object when said pointing device is in said first operative mode; and
   wherein said image displayed on said display device is rotatable proportional to rotational movement of said photosensor device relative to said object when said pointing device is in said second operative mode.

30. The pointing device of claim 29 wherein said photosensor device is a two-dimensional photosensor array.

31. The pointing device of claim 29 wherein said photosensor device comprises a linear array of photodetector elements.

32. The pointing device of claim 29 and further comprising a second photosensor device attached to said chassis, said second photosensor device being adapted to output data corresponding to images of said object.

33. A computer comprising:
   a pointing device, said pointing device comprising:
      a chassis adapted to be moved relative to an object; and
      a first photosensor device and a second photosensor device attached to said chassis, said first photosensor device and said second photosensor device being adapted to output data corresponding to images of said object;
   a display device electrically connected to said pointing device;
   wherein an image is displayable on said display device, said image being rotatable proportional to the rotational movement of said pointing device relative to said object.

34. The computer of claim 33 wherein said processor is adapted to:
   output data to said display device to cause an image to be displayed on said display device;
   analyze said data output from said pointing device to determine the movement of said pointing device relative to said object; and
   output data to said display device to cause said image to move based on said movement of said pointing device relative to said object.

35. The computer of claim 33 wherein said first photosensor device comprises a two-dimensional photosensor array.

36. The computer of claim 33 and further comprising a first light path extending between a plane and said first photosensor device.

37. The computer of claim 36 and further comprising a lens attached to said chassis and a second light path, said second light path extending between said lens and said plane.

38. The computer of claim 33 wherein said computer has a first operative mode and a second operative mode and further comprising a light source attached to said chassis, said light source having a first operative mode and a second operative mode, wherein said light source is in said first operative mode when said computer is in said first operative mode, and wherein said light source is in said second operative mode when said computer is in said second operative mode.

39. A pointing device for directing movement of an image displayed on a display device, said pointing device comprising:
   a chassis;
   a photosensor device attached to said chassis;
   a first light path extending between a first plane and said photosensor device;
   a second light path extending between a second plane and said photosensor device;
   a first optical component located in said first light path;
   a second optical component located in said second light path;
   a first light source associated with said first plane;
   a third light path extending between said first light source and said first plane;
   a second light source associated with said second plane; and
   a fourth light path extending between said second light source and said second plane.

40. The pointing device of claim 39 further comprising a partial reflection device, wherein:
   said first light path and said second light path intersect at said partial reflection device;
   said first light path passes through said partial reflection device; and
   said second light path reflects from said partial reflection device.

41. The pointing device of claim 39 further comprising a beam splitting device wherein:
- said first light path and said second light path intersect at said beam splitting device;
- said first light path passes through said beam splitting device; and
- said second light path reflects from said beam splitting device.

42. The pointing device of claim 39 wherein said first optical device and said second optical device are shutter devices.

43. The pointing device of claim 39 wherein said pointing device has a first operative mode and a second operative mode and further comprising a light source attached to said chassis, said light source having a first operative mode and a second operative mode, wherein said light source is in said first operative mode when said pointing device is in said first operative mode, and wherein said light source is in said second operative mode when said pointing device is in said second operative mode.

44. A method of manipulating an image displayed on a display device, said method comprising:
- rotating a pointing device relative to an object;
- generating image data representative of images of said object using at least one photosensor device attached to said pointing device;
- analyzing said image data to determine the rotational movement of said pointing device relative to said object; and
- rotating said image displayed on said display device based on said rotational movement of said pointing device relative to said object.

45. The method of claim 44 wherein said pointing device further comprises providing a second photosensor device attached to said chassis, said second photosensor device being adapted to generate image data representative of images of said object.

46. The method of claim 45 wherein said second photosensor device comprises a linear array of photodetector elements.

* * * * *